April 26, 1960      M. J. BLES      2,934,108
TOOL FOR CUTTING TREE STUMPS AND ROOTS
Filed Jan. 10, 1958      2 Sheets-Sheet 1

INVENTOR.
MARCUS J. BLES,
BY
McMorrow, Berman & Davidson
ATTORNEYS.

April 26, 1960  M. J. BLES  2,934,108
TOOL FOR CUTTING TREE STUMPS AND ROOTS
Filed Jan. 10, 1958  2 Sheets-Sheet 2
FIG. 2.
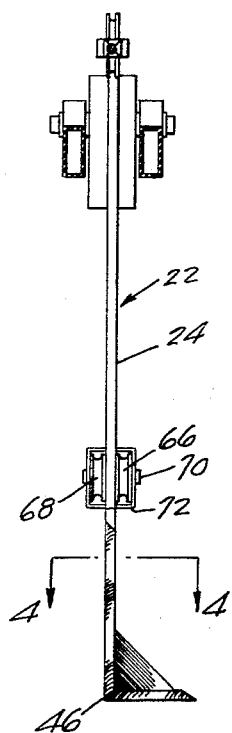
FIG. 3.
FIG. 5.
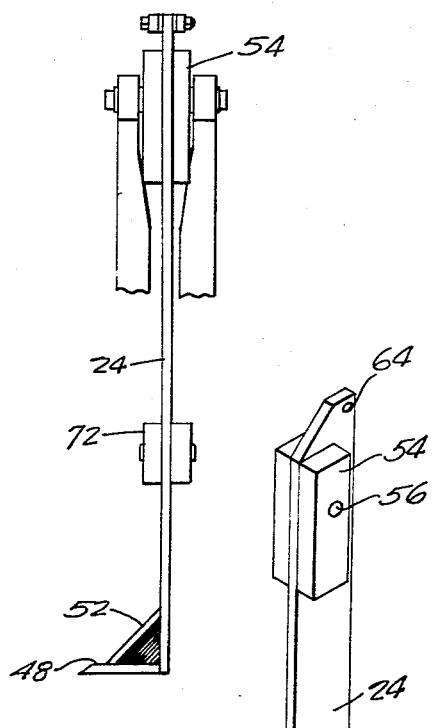
FIG. 4.
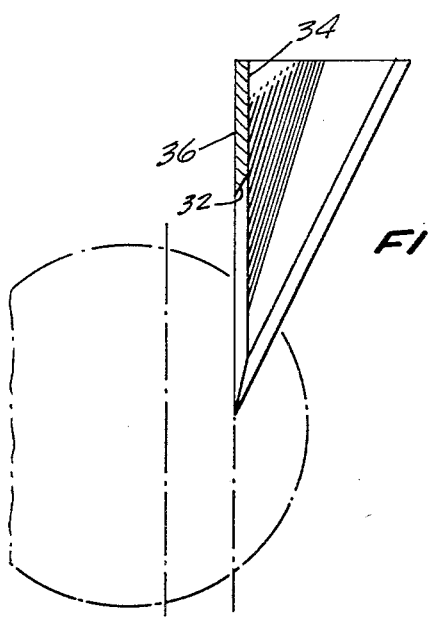
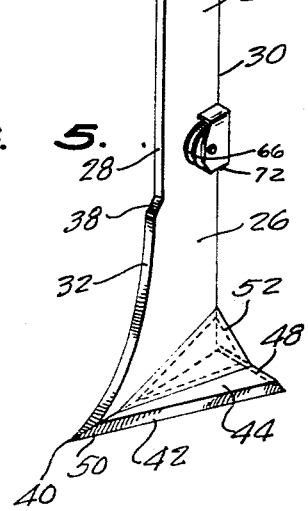
INVENTOR.
MARCUS J. BLES,
BY
McMorrow, Berman & Davidson
ATTORNEYS.

United States Patent Office 2,934,108
Patented Apr. 26, 1960

2,934,108

TOOL FOR CUTTING TREE STUMPS AND ROOTS

Marcus J. Bles, McLean, Va.

Application January 10, 1958, Serial No. 708,287

8 Claims. (Cl. 144—2)

The present invention generally appertains to apparatus for cutting tree stumps and roots and more particularly relates to a tool, which is constructed and adapted to be mounted on and manipulated by a mobile frame, such as a conventional back digger or similar excavating machine.

A primary object of the present invention is to provide a simply and sturdily constructed tool for cutting tree stumps and roots, which tool can be effectively, easily and inexpensively attached to and operated by the controls of a mobile construction apparatus, such as a conventional back digger or similar excavating machine.

A further object of the present invention is to provide a tree stump and root cutting and splitting tool, which is so formed as to be mounted on a boom, which is pivotally carried by and extends from a mobile frame, the frame being provided with an operating means, which is connected to the tool so as to swing the tool vertically about a horizontal axis on the boom.

A further important object of the present invention is to provide a cutting tool, which is pivotally mounted on the boom and which has its upward movement and its downward cutting or power movement actuated and controlled by the conventional operating cable means of the excavating machine and which tool is formed so as to cut or slice the tree stump vertically and horizontally at the same time, while displacing very little earth so as to utilize the full power of the excavating machine.

A further important object of the present invention is to provide means for mounting the cutting tool on the boom so that the boom can operate to adjust the cut of the cutting tool for any desired depth.

A further important object of the present invention is to provide a one-piece tool, which includes a lever arm or shank on the lower end of which a cutter is provided, the cutter including a vertical cutting edge and a horizontal cutting edge, such cutting edges being disposed substantially normal to each other, whereby a simultaneous vertical and horizontal cut may be made in the tree stump.

The foregoing and ancillary objects, including the provision of an extremely sturdy, effective and inexpensive tree stump cutting tool, are attained by this invention, the preferred embodiment of which is illustrated in the accompanying drawings, wherein:

Figure 2 is a vertical sectional view taken on line 2—2 of Figure 1 and showing the front edge of the cutting tool, specifically illustrating the vertical and horizontal cutting edges on the cutting end of the tool;

Figure 3 is a rear elevational view of the cutting tool;

Figure 4 is a transverse sectional view taken on line 4—4 of Figure 2; and

Figure 5 is a view in perspective of the cutting tool.

Figure 1:
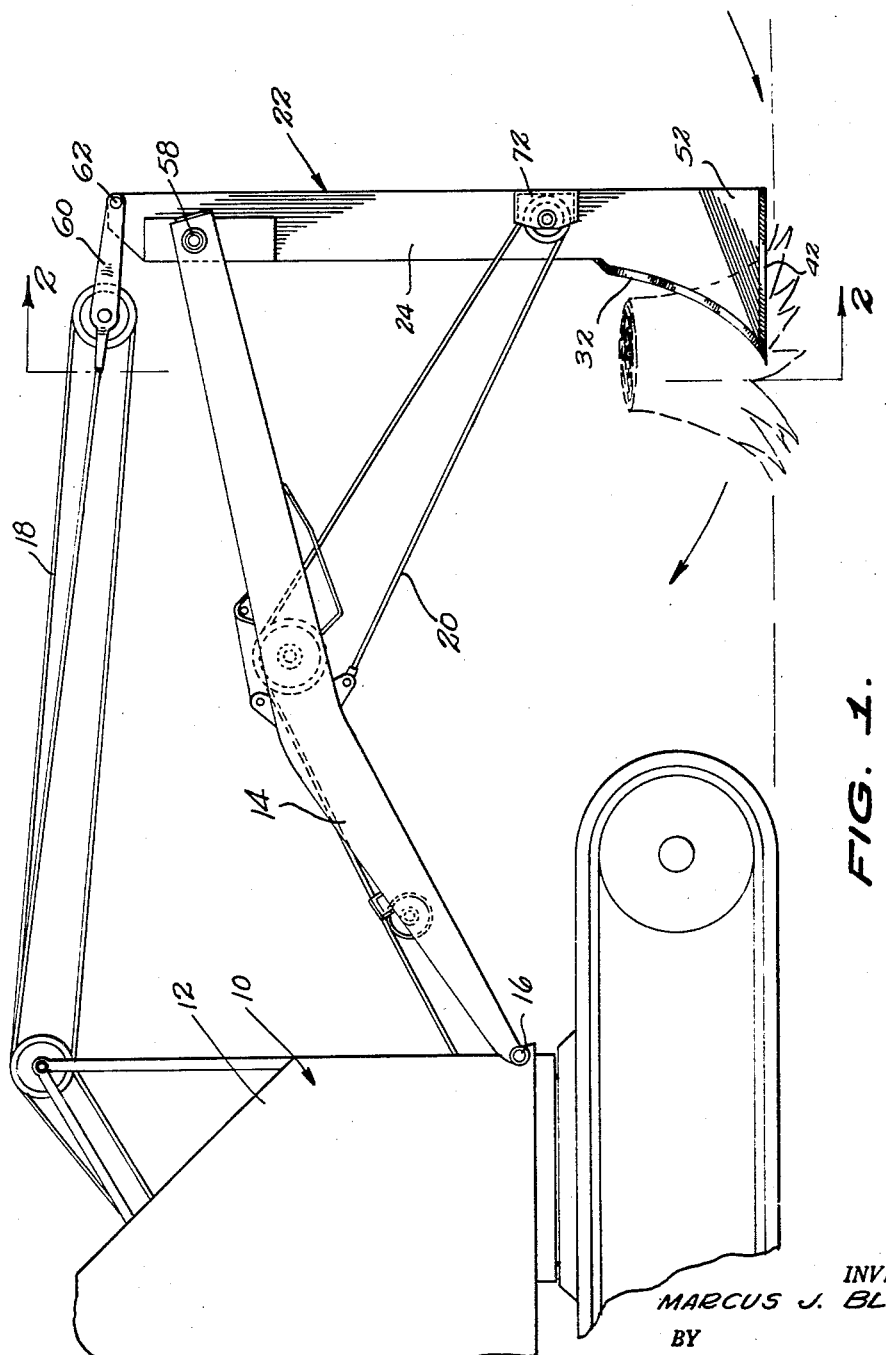
Figure 1 is a side elevational view of the tool of this invention, showing the same in operative association and attachment with a conventional back digger or similar excavating machine, which is used in pipe line construction.

Referring now more specifically to the accompanying drawings, and initially to Figure 1, the reference numeral 10 generally designates a mobile frame, which purely for purposes of illustration is shown as a conventional back digger or excavating machine, which is conventionally employed in the formation of trenches or ditches in pipe line construction. The apparatus or machine 10 includes a crawler unit 12, which has a boom 14, that is pivoted at 16 for vertical swinging movement. Conventionally, the outer end of the boom would support the digging unit of the machine. Such digging unit would be controlled in its swinging movements, the digging unit having a bucket or shovel on its lower end, by the operating cables 18 and the power cables 20, the operating cables serving to swing the digging unit upwardly out of the earth, while the cables 20 serve to swing the digging unit down into the earth, whereby the bucket or shovel can dig into and excavate the earth.

The primary aim and purpose of this invention is to provide a cutting tool 22, which can be mounted on the boom 14 in place of the conventional digging unit and which can be used for the purposes of splitting tree stumps, as shown in Figures 1 and 4.

The cutting tool 22, as shown more particularly in Figures 2–5, includes a flat lever arm or shank 24, which is formed with a lower cutting end 26. The shank 24 is substantially rectangular in cross-section and has a front or leading edge 28 with a trailing edge 30.

The cutting end 26 is formed by shaping the lower end portion of the leading edge 28 is an outstanding and downwardly and outwardly sweeping cutting edge 32. The cutting edge 32 is formed by bevelling the edge from the flat side 34 to the opposing flat side 36, as shown particularly in Figure 4. It is to be particularly noted, as shown in Figures 1 and 5, that the cutting edge 32 is joined by an offset 38 to the straight edge 28 of the shank or lever arm 24. The cutting edge 32, which is the vertical cutting edge, is curved downwardly and outwardly to a point 40, where it joins a horizontal cutting edge 42.

The horizontal cutting edge 42 is formed on the outer edge of a flat triangular piece 44, which is joined to the bevelled bottom edge 46 of the lower end portion 26 of the shank 24. The flat plate 44 is triangular in plan and the base portion 48 thereof adjoins the trailing edge 30 of the shank, while the apex 50 is joined to the bottom end of the vertical cutting edge 32 at the point 40.

It is to be particularly noted that the cutting edge 42 is bevelled in the same direction as the cutting edge 32 and that the cutting edges slice into the tree stump in a smooth and easy manner, as shown in Figure 4.

To rigidify the plate 44, a triangular reinforcement web 52 is secured, by welding or other suitable means, between the upper face of the plate 44 and the adjoining portion of the side wall 26 of the shank or lever arm 24.

In order to mount the cutting tool 22 on the boom 14, the upper end of the lever arm 24 is formed with mounting blocks 54, which may be suitably secured on the opposing faces or side walls 34 and 36 of the lever arm. The blocks have openings 56 for a pivot pin 58.

For operating the tool, the operating cables 18 are attached to the tool by attaching the conventional sheave supporting bracket 60 by a pin 62, which passes through a transverse opening 64 in the upper end of the lever arm.

Sheaves 66 and 68 are rotatably supported by stub axles 70, which are mounted in brackets 72 in opposed relation on the opposing faces 34 and 36 of the lever arm, slightly above the cutting edge 32. These sheaves receive the power cables 20.

Thus, the lever arm 24 pivots about the axis 58, when the cables 18 are drawn in by the winch or other power means on the crawler unit, under the operation of the conventional controls on the crawler unit. The tool 22 is thus drawn upwardly and, when the cables 18 are released and the power cables 20 are operated, the tool is forcibly moved downwardly in a curvilinear path under the full force of the operating mechanism of the machine, about the pivot 58, with the cutting end being driven into the tree stump, as shown in Figure 1. As the cutting end engages the tree stump, the cutting edges 32 and 42 simultaneously form vertical and horizontal cuts in the tree stump. A series of such cuts, formed in spaced fashion, as shown in Figure 4, is sufficient to completely render the tree stump in a condition wherein it may be readily and easily removed from the ground.

Obviously, the depth of the cut may be controlled by the boom 14 so that the cutting end can slice or cut the root or underground portion of the tree stump to any desired depth. It is to be particularly noted that the full operating force of the machine will be used, since the cutting end is particularly designed so as to displace very little earth.

While the cutting tool has been disclosed as mounted on and controlled by a conventional excavating unit, it is to be understood that any type of machine or apparatus may be used, which would be adaptable for supporting the cutting tool and for swinging the cutting tool about a horizontal axis so as to force the cutting edges, under power, into a tree stump.

What is claimed is:

1. A tree stump cutting and splitting apparatus comprising a mobile frame, a boom pivotally mounted on the frame for vertical swinging movement, a tool pivotally carried by the boom for movement about its pivot in a vertical plane, said tool being in the form of an elongated, single lever arm having upper and lower end portions, means pivoting the lever arm adjacent its upper end portion to the boom, means connected to the lever arm above and below its pivot for swinging the lever arm in a curvilinear path of movement about its pivot toward and away from the frame, said lower end portion of the lever arm having a vertical edge facing the frame, said vertical edge being provided with cutting means extending down to its lower end, said lower end portion of the lever arm having a side and a blade element extending laterally from the side at the lower end of the lower end portion and being arranged in a plane at right angles to the side and the vertical edge and having an outer cutting edge that diverges outwardly from a juncture with the lower end of the vertical edge and its cutting means so that a combined horizontal and vertical cut is made in a tree stump upon each contact of the lever arm with the tree stump.

2. A tree stump cutting and splitting apparatus comprising a mobile frame, a boom pivotally mounted on the frame for vertical swinging movement, a tool pivotally carried by the boom for movement about its pivot in a vertical plane, said tool being in the form of an elongated, single lever arm having upper and lower end portions, means pivoting the lever arm adjacent its upper end portion to the boom, means connected to the lever arm above and below its pivot for swinging the lever arm in a curvilinear path of movement about its pivot toward and away from the frame, said lower end portion of the lever arm having a vertical edge facing the frame, said vertical edge being provided with cutting means extending down to its lower end, said lower end portion of the lever arm having a side and a blade element extending laterally from the side at the lower end of the lower end portion and being arranged in a plane at right angles to the side and the vertical edge and having an outer cutting edge that diverges outwardly from a juncture with the lower end of the vertical edge and its cutting means so that a combined horizontal and vertical cut is made in a tree stump upon each contact of the lever arm with the tree stump, said blade element being in the form of a triangular plate having its apex sharpened and joining with the lower end of the vertical edge and forming a cutting point with the cutting means on said vertical edge.

3. A tree stump cutting and splitting apparatus comprising a mobile frame, a boom pivotally mounted on the frame for vertical swinging movement, a tool pivotally carried by the boom for movement about its pivot in a vertical plane, said tool being in the form of an elongated, single lever arm having upper and lower end portions, means pivoting the lever arm adjacent its upper end portion to the boom, means connected to the lever arm above and below its pivot for swinging the lever arm in a curvilinear path of movement about its pivot toward and away from the frame, said lower end portion of the lever arm having a vertical edge facing the frame, said vertical edge being provided with cutting means extending down to its lower end, said lower end portion of the lever arm having a side and a blade element extending laterally from the side at the lower end of the lower end portion and being arranged in a plane at right angles to the side and the vertical edge and having an outer cutting edge that diverges outwardly from a juncture with the lower end of the vertical edge and its cutting means so that a combined horizontal and vertical cut is made in a tree stump upon each contact of the lever arm with the tree stump, said blade element being in the form of a triangular plate having its apex sharpened and joining with the lower end of the vertical edge and forming a cutting point with the cutting means on said vertical edge, and a triangular reinforcement webbing diagonally connected between the upper face of the plate and said side of the lever arm, said webbing diverging outwardly from a point adjacent to said cutting point.

4. A tree stump cutting and splitting apparatus comprising a mobile frame, a boom pivotally mounted on the frame for vertical swinging movement, a tool pivotally carried by the boom for movement about its pivot in a vertical plane, said tool being in the form of an elongated, single lever arm having upper and lower end portions, means pivoting the lever arm adjacent its upper end portion to the boom, means connected to the lever arm above and below its pivot for swinging the lever arm in a curvilinear path of movement about its pivot toward and away from the frame, said lower end portion of the lever arm having a vertical edge facing the frame, said vertical edge being provided with cutting means extending down to its lower end, said lower end portion of the lever arm having a side and a blade element extending laterally from the side at the lower end of the lower end portion and being arranged in a plane at right angles to the side and the vertical edge and having an outer cutting edge that diverges outwardly from a juncture with the lower end of the vertical edge and its cutting means so that a combined horizontal and vertical cut is made in a tree stump upon each contact of the lever arm with the tree stump, said vertical edge at the lower end portion of the lever arm being concaved and the cutting means consisting of said edge being sharpened.

5. A tree stump cutting and splitting apparatus comprising a mobile frame, a boom pivotally mounted on the frame for vertical swinging movement, a vertically disposed one-piece, elongated lever arm having an upper end portion and a lower end portion, means pivotally mounting the lever arm at its upper end portion to the boom for vertical swinging movement of the lever arm about a horizontal axis, means carried by the frame and connected to the lever arm above and below its pivot point for vertically swinging the lever arm toward and away from the frame, said lower end portion of the lever arm having a sharpened vertical cutting edge facing the frame and being inwardly curved down to its lower end, said lever arm having a side disposed at right angles to the vertical cutting edge, a triangular plate secured to the side and laterally extending therefrom at the lower end of the lower end portion, said plate having its apex forming a juncture with the lower end of the vertical cutting edge and defining a common cutting point therewith and said plate having an outer sharpened cutting edge diverging from the cutting point so that a combined vertical and horizontal cut is made in a tree stump upon each contact of the lever arm with the tree stump.

6. In an apparatus for cutting and splitting tree stumps, a tool comprising an elongated one-piece lever arm adapted to be mounted in a vertical position for curvilinear swinging movement about a horizontal axis, said lever arm having upper and lower end portions, means on the upper end portion for pivotally mounting the lever arm for vertical swinging movement, means provided on the upper end portion above and below said last named means for connecting the lever arm to a power means for producing the swinging movement of the lever arm, said lower end portion of the lever arm having a vertical cutting edge extending down to the lower end of the lower end portion and being inwardly curved, said lower end portion having a side disposed at right angles to the vertical cutting edge and a plate laterally extending from the side at the lower end of the lower end portion and having an outer cutting edge disposed at right angles to the vertical cutting edge and diverging from the vertical cutting edge and being joined with the lower end of the vertical cutting edge to define a common cutting point therewith.

7. In combination with a machine which includes a crawler unit having a boom pivotally extending therefrom and having operating cable means; a tool for splitting and cutting tree stumps, said tool comprising a one-piece, elongated lever arm having an upper and lower end portion, means pivotally attaching the lever arm at the upper end portion to the boom for vertical swinging movement of the lever arm about a horizontal axis, means provided on the upper end portion above and below the last named means for connecting the lever arm to the operating cable means for producing a curvilinear swinging movement of the lever arm, said lower end portion of the lever arm having a vertical cutting edge facing the machine and being inwardly curved and terminating at its lower end in a point, said lower end portion of the lever arm having a side disposed at right angles to the vertical cutting edge, a flat plate laterally extending from the side at right angles thereto and disposed at the lower end thereof, said plate having an outer cutting edge which is joined with the point at the lower end of the vertical cutting edge and complements the cutting point and said outer cutting edge of the plate diverging outwardly from such point.

8. In combination with a machine which includes a crawler unit having a boom pivotally extending therefrom and having operating cable means; a tool for splitting and cutting tree stumps, said tool comprising a one-piece, elongated lever arm having an upper and lower end portion, means pivotally attaching the lever arm at the upper end portion to the boom for vertical swinging movement of the lever arm about a horizontal axis, means provided on the upper end portion above and below the last named means for connecting the lever arm to the operating cable means for producing a curvilinear swinging movement of the lever arm, said lower end portion of the lever arm having a vertical cutting edge facing the machine and being inwardly curved and terminating at its lower end in a point, said lower end portion of the lever arm having a side disposed at right angles to the vertical cutting edge, a flat plate laterally extending from the side at right angles thereto and disposed at the lower end thereof, said plate having an outer cutting edge which is joined with the point at the lower end of the vertical cutting edge and complements the cutting point and said outer cutting edge of the plate diverging outwardly from such point, and a reinforcement means connected between the side and the plate and diverging outwardly from adjacent the cutting point.

References Cited in the file of this patent

UNITED STATES PATENTS

| | | |
|---|---|---|
| 1,191,255 | Wilkes | July 18, 1916 |
| 1,369,954 | Beasley | Mar. 1, 1921 |
| 1,919,075 | Rasmussen | July 18, 1933 |
| 2,388,461 | Baker | Nov. 6, 1945 |
| 2,495,052 | Cole | Jan. 17, 1950 |